March 4, 1924.

F. I. DU PONT

WATER GAUGE FOR STEAM GENERATORS

Filed April 13, 1921

1,485,492

WITNESS:

INVENTOR
Francis I. du Pont
BY
ATTORNEY

Patented Mar. 4, 1924.

1,485,492

UNITED STATES PATENT OFFICE.

FRANCIS I. du PONT, OF WILMINGTON, DELAWARE, ASSIGNOR TO DELAWARE CHEMICAL ENGINEERING CO., OF WILMINGTON, DELAWARE, A CORPORATION OF DELAWARE.

WATER GAUGE FOR STEAM GENERATORS.

Application filed April 13, 1921. Serial No. 460,998.

*To all whom it may concern:*

Be it known that I, FRANCIS I. DU PONT, a citizen of the United States, residing at Wilmington, county of New Castle, and State of Delaware, have invented a new and useful Improvement in Water Gauges for Steam Generators, of which the following is a full, clear, and exact description, reference being had to the accompanying drawings, which form a part of this specification.

This invention relates to an improvement in water gauges for steam generators, and is designed to provide a device of this character which may be located at a convenient point of observation either on the generator or remote therefrom.

Another object of my invention is to provide a device of this character in which one end only of the glass sight tube is in communication with the generator.

The invention is more especially applicable to conditions which make it advisable or necessary to ascertain the water level of a boiler where the point of observation is such as to make it impossible to inspect an ordinary water gauge, as, for example, in the case of steam boilers of automobiles, where the driver is located at a point above and distant from the boiler and where no ordinary water gauge would be observable.

The precise nature of my invention will be best understood by reference to the accompanying drawings, which will now be described, it being premised, however, that various changes may be made in the details of construction without departing from the spirit and scope of my invention as defined in the accompanying claims.

Figure 1:
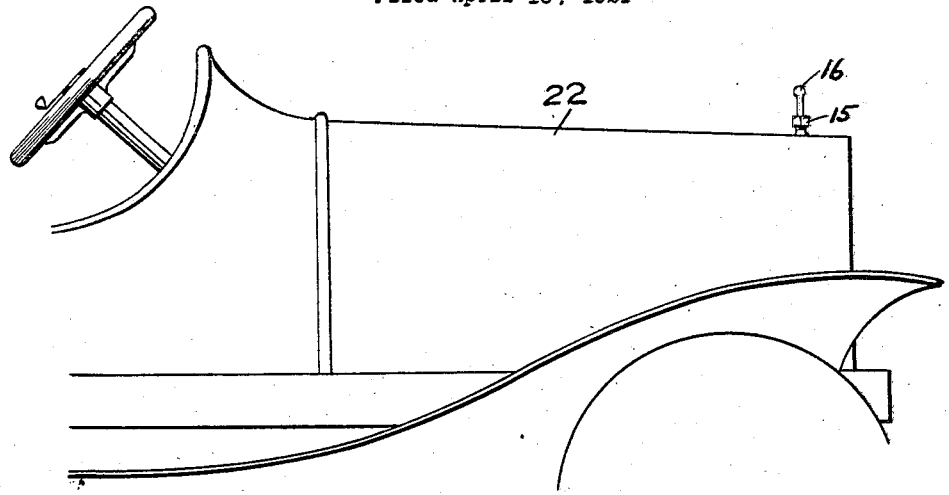

Fig. 1 of the drawings is a side elevation of a steam driven automobile with one form of my invention applied.

Figure 2:
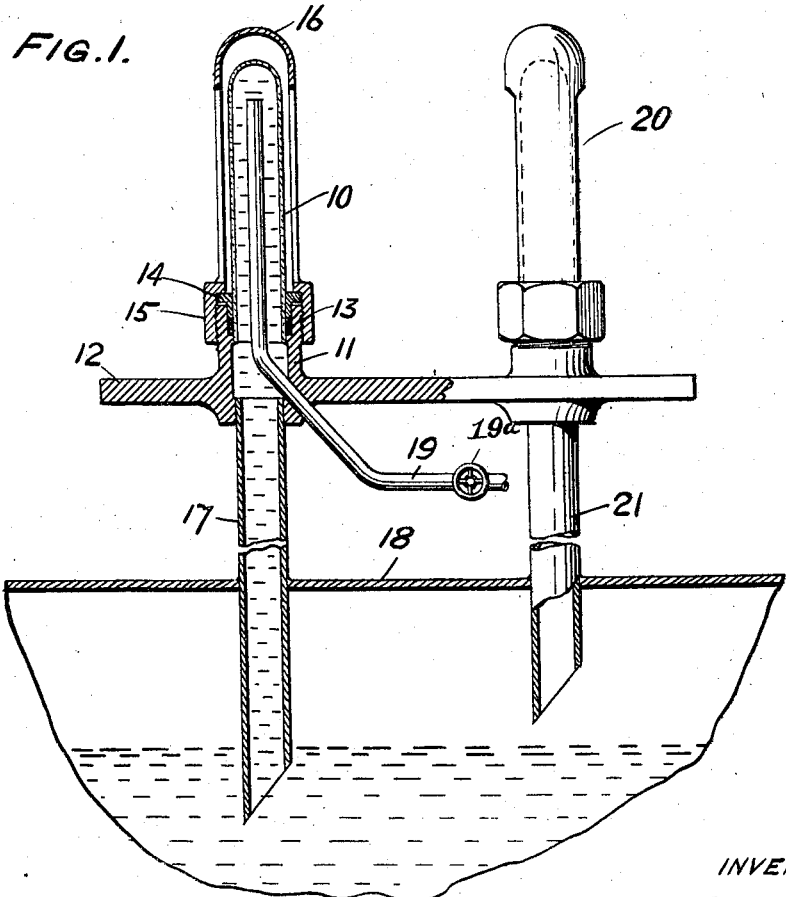

Fig. 2 is a sectional view showing two glasses connected to a boiler.

In Fig. 2 of the drawings the gauge glass 10, which is closed at one end, is secured at its open end to a boss 11 which is connected to, or formed integral with, a support 12. The boss 11 forms the shell of a stuffing box in which the open end of the glass tube is secured by means of a packing member 13, gland 14 and a flanged nut 15. 16 is a guard for the glass tube connected to the nut and which is provided with openings through which the glass tube may be observed.

Connected to the support 12 and communicating with the space within the boss 11 is a pipe 17 which extends through the shell 18 of the generator. This tube extends into the generator to a point somewhat below the normal water level but above the level to which the water may fall without danger to the generator. The lower end of this pipe 17 is cut at an acute angle to prevent the sealing of the lower end of the tube, so that the water will freely flow from the glass 10 and pipe 17 when the level of the water in the generator falls below the end thereof. 19 is a bleed tube extending into the upper end of the glass 10, and is provided with a suitable valve 19ᵃ for permitting the air to pass from the gauge when the boiler is filled, or for bleeding the gauge when desired.

Located adjacent to the above described gauge is a similar gauge 20, having a pipe 21 similar to the pipe 17 and for the same purpose, but which is somewhat shorter than the pipe 17. The end of this pipe 21 within the generator is located above the end of pipe 17, and at the point above which it is desired the water shall not rise.

When the water falls below the end of pipe 17, the water in the pipe will pass to the boiler and indicates that the water in the generator has fallen below the level of the end of said pipe. If sufficient water is now delivered to the generator to raise the level above the end of the pipe 17, the trapped steam in the tube 10 and pipe 17 will condense and the tube will be filled with water by the pressure in the generator. If the water level should rise above the end of pipe 21, the steam in pipe 21 and its glass tube will condense and the glass tube of gauge 20 will be filled with water by the generator pressure so that it can be readily observed that the level of the water in the generator has risen above the end of the pipe 21.

In Fig. 1, I have shown a gauge of the single type connected to a steam generator under the hood 22, and which may or may not be provided with a bleed pipe such as 19.

By means of a gauge of the double type, it can readily be seen if the level of the water in the generator is between the ends of the two pipes or above or below the ends of the pipes.

If desired, I may place more than two gauges on the generator if it is desired to ascertain the water level within closer limits or over a greater range than that above described.

It will also be appreciated that a plurality of gauges located at different points for observance may be connected to each predetermined level, so that the water level in a generator or generators of a large plant may be observed at various widely separated places.

One of the advantages of my invention results from the provision of a water or liquid gauge in which the glass may be remote from the generator or container under pressure, in which it is desired to observe the water or liquid level, as well as a device of this character which can be located above the generator or container, and which is so arranged that the presence or absence of liquid in the glass will indicate whether or not the liquid level is above or below a predetermined level.

By means of a device of this type, I am enabled to place a gauge or gauges at any desired point or points so long as the glass is above the level of the liquid so that the liquid can flow from the glass to the generator or container when the level therein falls below said level.

A still further advantage results from the provision of a water gauge in which only one end is secured to the generator or container connections, which will permit making a tight joint and also prevent placing the glass between its ends under torsional or bending strains, and thereby eliminate the greatest cause of gauge glass breakage. This device may displace the usual water gauge in some cases, and in other cases may be used as a supplement thereto.

Where in the claims I specify a container under pressure, I do not mean to be confined to any degree of pressure, as it is obvious that the device will operate in the fall of water below a predetermined level when the container is under any substantial absolute pressure, as, for example, atmospheric pressure.

The water gauge shown in Fig. 1 is also shown in a companion case filed by me on even date herewith, Serial No. 460,996.

Having now fully described my invention, what I claim and desire to protect by Letters Patent is:

1. A liquid gauge for a container under steam pressure comprising a tube having normally a single opening, such opening communicating with the interior of the container at a level below the desired minimum level of liquid in the container so that when the level of water therein is at or above said minimum level the pressure in the container will substantially fill said tube with liquid, said tube extending into visible position so that a fall of the level of liquid below the desired minimum will be visibly registered by the emptying of the tube.

2. A liquid gauge for determining whether the level of liquid in a container under steam pressure is between desired maximum and minimum levels comprising two tubes normally closed except for openings into the container at different levels, whereby, when said liquid is at a level within the desired range, one of said tubes will be filled with liquid and the other empty, said tubes extending into visible position so that the emptying of the first tube or the filling of the second will indicate a fall in liquid level below said minimum or a rise in liquid level above said maximum.

3. A liquid level gauge for a container under pressure, comprising an indicator closed to the container at the upper end and above the level at which the liquid is to be registered, and a pipe connected to the lower end of the indicator and communicating with the container at the level to be registered, said device being adapted to indicate whether the water is above or below the lower end of the pipe without circulating through the indicator.

4. A liquid level gauge for a container under pressure, comprising an indicator closed to the container at its upper end and above the level at which the liquid is to be registered, a pipe connected to the lower end of the indicator and communicating with the container at the level to be registered, and a bleed pipe connected to the upper end of the gauge, said device being adapted to indicate whether the water is above or below the lower end of the pipe without circulating through the indicator.

5. A water gauge for a container under pressure, comprising a gauge glass extending above the zone at which it is desired to maintain water in the container, said glass being closed at its upper portion to the container, and a pipe connecting the lower end thereof to said zone at which it is desired to maintain water in the container, said glass being arranged to be substantially filled with water when the water level in the container is above the end of the pipe.

6. A water gauge for a container under pressure, comprising a gauge glass closed at its upper end, a pipe connecting the lower end thereof to the water space of the container, said pipe and glass being arranged to be substantially filled with water when the water level is above the end of the pipe in the container, and a bleed pipe connected to the upper portion of the gauge.

7. A water gauge for a steam generator having an indicator above the generator, said indicator being closed to said generator at its upper end, the lower end of the indicator being in communication with said generator at the level at which it is desired to indicate the rise and fall of the water, the steam pressure generated in the generator being adapted to force the water up into the indicator when the water in the generator rises above a predetermined level, the water outflowing from the indicator when the water in the generator falls below said level.

8. Means for indicating whether the level of the water in a steam generator is between certain limits, comprising a plurality of gauges having indicators above said limits and closed to the generator at their upper ends, and a pipe connecting the lower end of each indicator with the generator at the level at which it is desired said indicator shall indicate whether the water is above or below said level.

9. Means for indicating whether the level of the water in a steam generator is above a predetermined limit, below a predetermined limit, or between said limits, comprising two water gauges, each gauge having a glass above the limit level to be indicated, said glasses being closed to the generator at their upper ends, and a pipe connecting the lower end of each glass with the generator, the end of one pipe communicating with the generator at one limit level while the other communicates therewith at the other limit level.

10. Means for indicating whether the level of the water in a steam generator is within certain limits, comprising a plurality of indicators closed at their upper ends to the generator and a plurality of pipes respectively connected therewith extending into the water space of the boiler and opening therein at different levels.

11. Means for determining whether the level of liquid in a container is within a zone within which it is desired to maintain the level of the liquid, comprising two indicators located outside the container, the upper ends being closed to the container, and pipes respectively connecting the indicators with the interior of the container, one of said pipes opening into the container at about the upper level of said zone and the other of which opens into the container at about the lower level of said zone, whereby when the level of the liquid is within said zone, the liquid will be forced up one pipe into its indicator while the other pipe and indicator will be empty.

In testimony of which invention I have hereunto set my hand, at Wilmington, Delaware, on this 28th day of March, 1921.

FRANCIS I. du PONT.